US011085371B2

(12) United States Patent
Kupratis et al.

(10) Patent No.: US 11,085,371 B2
(45) Date of Patent: Aug. 10, 2021

(54) TURBOFAN WITH MOTORIZED ROTATING INLET GUIDE VANE

(71) Applicant: United Technologies Corporation, Farmington, CT (US)

(72) Inventors: Daniel Bernard Kupratis, Wallingford, CT (US); Dmitriy B. Sidelkovskiy, Ellington, CT (US); Neil Terwilliger, Meriden, CT (US); William G. Sheridan, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 41 days.

(21) Appl. No.: 16/550,576

(22) Filed: Aug. 26, 2019

(65) Prior Publication Data

US 2020/0063657 A1 Feb. 27, 2020

Related U.S. Application Data

(63) Continuation of application No. 16/110,473, filed on Aug. 23, 2018, now Pat. No. 10,738,694.

(51) Int. Cl.
| | |
|---|---|
| *F02C 3/067* | (2006.01) |
| *F02C 7/32* | (2006.01) |
| *F02K 3/06* | (2006.01) |
| *F02K 3/072* | (2006.01) |
| *B64D 27/02* | (2006.01) |

(52) U.S. Cl.
CPC ............ *F02C 3/067* (2013.01); *F02C 7/32* (2013.01); *F02K 3/06* (2013.01); *F02K 3/072* (2013.01); *B64D 2027/026* (2013.01)

(58) Field of Classification Search
CPC .... F02C 3/067; F02C 7/32; F02K 3/06; F02K 3/072; F02K 2027/026
See application file for complete search history.

(56) References Cited

U.S. PATENT DOCUMENTS

| | | | |
|---|---|---|---|
| 7,140,832 B2 | 11/2006 | Jacks | |
| 8,464,511 B1 | 6/2013 | Ribarov et al. | |
| 8,857,191 B2 | 10/2014 | Hyde et al. | |
| 9,181,900 B1 | 11/2015 | Lugg | |
| 9,476,385 B2 | 10/2016 | Moore et al. | |
| 9,835,044 B2 | 12/2017 | Lecordix | |
| 10,724,395 B2* | 7/2020 | Kupratis | .............. H02K 7/1823 |

(Continued)

FOREIGN PATENT DOCUMENTS

| | | |
|---|---|---|
| FR | 2994707 A1 | 2/2014 |
| GB | 2542184 A | 3/2017 |

OTHER PUBLICATIONS

European Search Report for European Application No. 19193181.5 dated Dec. 20, 2019.

*Primary Examiner* — Lorne E Meade
(74) *Attorney, Agent, or Firm* — Carlson, Gaskey & Olds, P.C.

(57) ABSTRACT

A gas turbine engine according to an exemplary embodiment of this disclosure includes, among other possible things, a fan including a plurality of fan blades rotatable about an axis, a plurality of inlet guide vanes mounted forward of the plurality of fan blades, the plurality of inlet guide vanes selectively rotatable about the axis independent of the plurality of fan blades; and a motor for controlling rotation of the plurality of inlet guide vanes about the axis.

19 Claims, 3 Drawing Sheets

(56) References Cited

U.S. PATENT DOCUMENTS

| | | | |
|---|---|---|---|
| 10,738,694 B1* | 8/2020 | Kupratis | ............... F02C 7/32 |
| 2006/0254255 A1 | 11/2006 | Okai et al. | |
| 2011/0277447 A1 | 11/2011 | Sturmer | |
| 2013/0174533 A1 | 7/2013 | Ribarov et al. | |
| 2013/0318999 A1 | 12/2013 | Lucas | |
| 2015/0000252 A1 | 1/2015 | Moore et al. | |
| 2015/0078888 A1 | 3/2015 | Golshany et al. | |

* cited by examiner

TURBOFAN WITH MOTORIZED ROTATING INLET GUIDE VANE

CROSS-REFERENCE TO RELATED APPLICATION

This application is a continuation of U.S. patent application Ser. No. 16/110,473 filed Aug. 23, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

The turbine section drives a fan that provides a substantial portion of thrust generated by the engine. Guide vanes aft of the fan direct airflow into the compressor section to increase compressor efficiency. Airflow into the fan maybe directed to some extent by a nacelle structure surrounding the fan blades, but otherwise is not pre-conditioned.

SUMMARY

A gas turbine engine according to an exemplary embodiment of this disclosure includes, among other possible things, a fan including a plurality of fan blades rotatable about an axis, a plurality of inlet guide vanes mounted forward of the plurality of fan blades, the plurality of inlet guide vanes selectively rotatable about the axis independent of the plurality of fan blades; and a motor for controlling rotation of the plurality of inlet guide vanes about the axis.

In a further embodiment of the foregoing gas turbine engine, the plurality of inlet guide vanes are movable from a non-rotating condition to a rotating condition independent of rotation of the plurality of fan blades.

In another embodiment of any of the foregoing gas turbine engines, the plurality of inlet guide vanes are rotatable at a speed different than the plurality of fan blades.

In another embodiment of any of the foregoing gas turbine engines, a fan hub supports rotation of the plurality of fan blades. The plurality of inlet guide vanes are rotatable, supported by the fan hub for rotation separate from the fan hub.

In another embodiment of any of the foregoing gas turbine engines, the motor is supported within the fan hub.

In another embodiment of any of the foregoing gas turbine engines, the motor comprises an electric motor.

In another embodiment of any of the foregoing gas turbine engines, the plurality of inlet guide vanes are rotatable about the axis in a direction opposite of rotation of the plurality of fan blades.

In another embodiment of any of the foregoing gas turbine engines, a geared architecture is driven by a turbine section of the gas turbine engine. The geared architecture includes an output driving the plurality of fan blades at a speed different than the turbine section.

In another embodiment of any of the foregoing gas turbine engines, the plurality of inlet guide vanes comprise an airfoil with a pitch that different than a pitch of the plurality of fan blades.

A turbofan engine according to an exemplary embodiment of this disclosure includes, among other possible things, a fan section including a plurality of fan blades supported by a fan hub rotatable about an axis; a compressor section; a combustor in fluid communication with the compressor section; a turbine section in fluid communication with the combustor; a geared architecture driven by the turbine section for rotating the fan section about the axis; an inlet guide vane assembly forward of the fan section and rotatable about the axis independent of the fan section; and a means for controlling rotation of the inlet guide vane assembly about the axis independent of the fan section.

In a further embodiment of the foregoing turbofan engine, means for rotating the inlet guide vane assembly is configured to hold the inlet guide vane assembly in a fixed position relative to rotation of the fan section.

In a further embodiment of any of the foregoing turbofan engines, the inlet guide vane assembly is rotatable in a direction opposite rotation of the fan section about the axis.

In a further embodiment of any of the foregoing turbofan engines, the inlet guide vane assembly is rotatable at a speed different than a speed of the fan section.

In a further embodiment of any of the foregoing turbofan engines, the means for rotating the inlet guide vane assembly comprises an electric motor.

In a further embodiment of any of the foregoing turbofan engines, the inlet guide vane assembly includes a plurality of vanes disposed at pitch different than the plurality of fan blades.

A method of operating a turbofan engine according to an exemplary embodiment of this disclosure includes, among other possible things, rotating a fan assembly including a plurality of fan blades about an axis; and imparting a predefined direction of airflow into the fan assembly with a rotatable inlet guide vane assembly disposed forward of the fan assembly.

In a further embodiment of the method of operating a turbofan engine, imparting the predefined direction of airflow includes rotating the inlet guide vane in a direction opposite rotation of the fan assembly about the axis.

In a further embodiment of any of the foregoing methods of operating a turbofan engine, imparting the predefined direction of airflow includes rotating the inlet guide vane assembly at a speed different than the fan assembly.

In a further embodiment of any of the foregoing methods of operating a turbofan engine, holding the inlet guide vane assembly in a fixed position relative to rotation of the fan assembly is included.

In a further embodiment of any of the foregoing methods of operating a turbofan engine, the inlet guide vane assembly is driven by an electric motor supported forward of the fan assembly.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
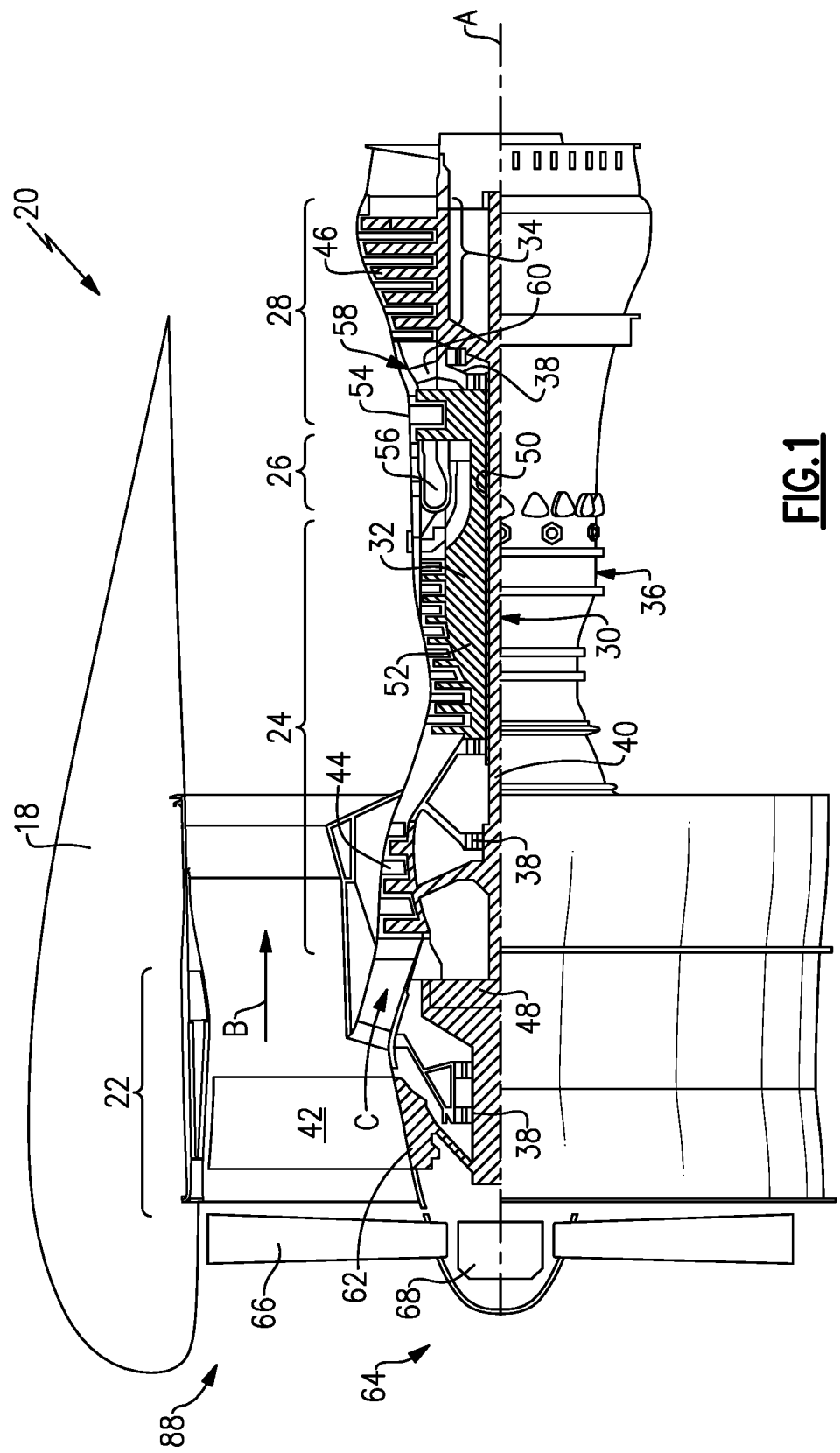
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \,°\, R)/(518.7 \,°\, R)]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The disclosed engine 20 includes an inlet guide vane system 64 forward of the fan section 22 for providing a beneficial pre-swirl and direction to airflow 15 into the fan section 22. The example inlet guide vane system 64 includes a plurality of guide vanes 66 that are rotatable about the engine axis A independent of rotation of the fan blades 42. A motor 68 is disposed forward of the fan section 22 and enables rotation of the guide vanes 66 independent of rotation of the fan blades 42.

Figure 2:
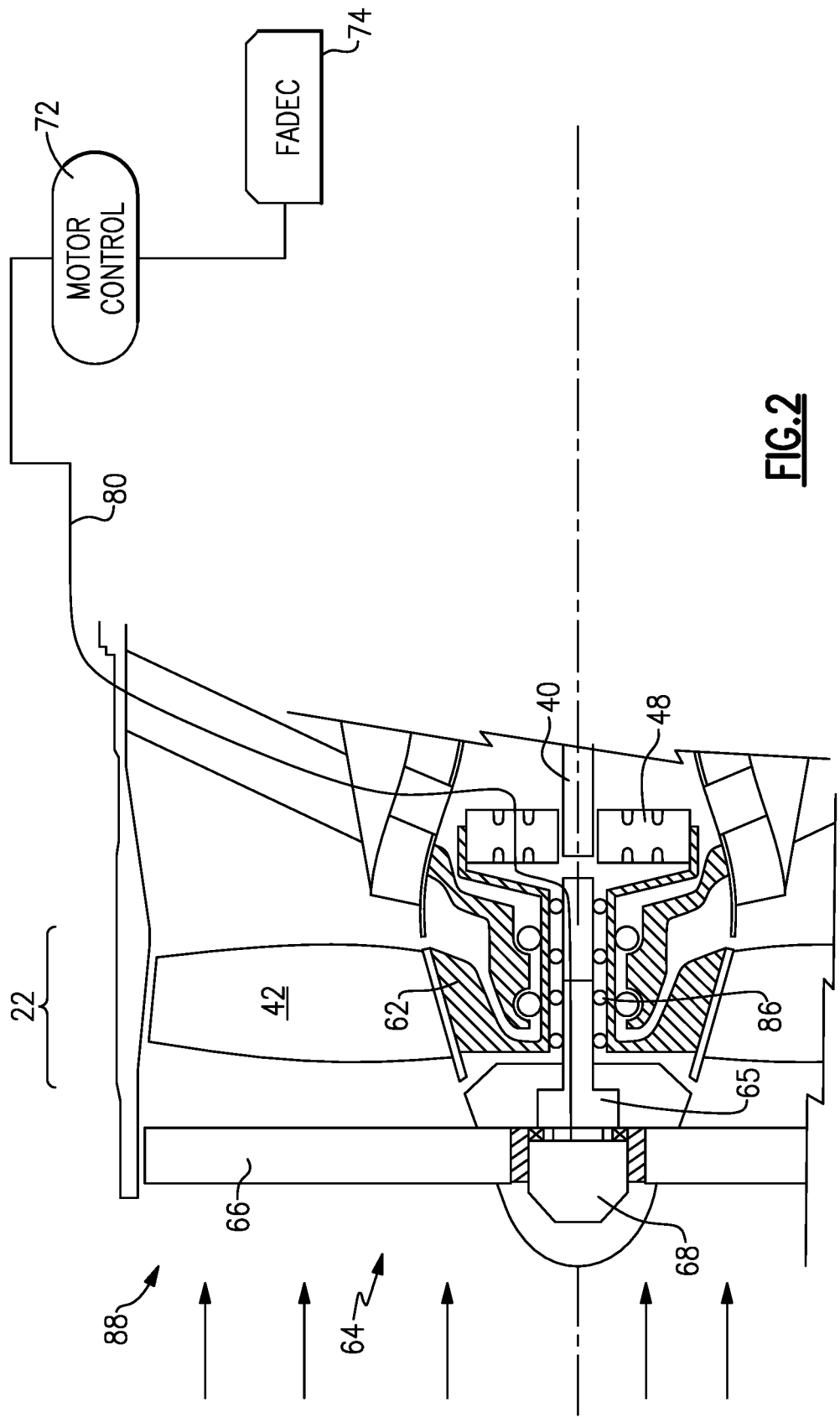
FIG. 2 is an enlarged schematic view of a fan section of the example gas turbine engine.

Referring to FIG. 2, with continued reference to FIG. 1, the example guide vane system 64 is utilized to precondition and direct airflow entering the fan section 22. The preconditioning or direction of airflow entering the fan section 22 provided by the guide vane system 64 enhances efficiency of the fan section 22. Moreover, the guide vane system 64 provides for the adjustment of a fan pressure ratio by preferentially rotating the guide vanes 66 forward of the fan blades 42 to preswirl airflow into the fan blades 42.

The fan blades 42 are supported by a fan hub 62 that is rotated, in this example, by an output from a geared architecture 48. Accordingly, the example fan section 22 rotates at a slower speed than the turbine 46 driving the fan section 22. Although the disclosed example includes a geared architecture to drive the fan section 22, direct drive engines would also benefit from this disclosure and is within the contemplation and scope of this disclosure.

The guide vane system 64 includes the motor 68 that rotates a guide vane hub 65 about the axis A. The guide vane hub 65 is rotatable by the motor 68 independent of rotation of the fan hub 62. In the disclosed embodiment, the hub 65 is supported by bearings 86 within the rotating fan hub 62, such that the hub 65 is not subject to rotation with the fan hub 62.

In the disclosed example embodiment, the guide vanes 66 are mounted to the hub 65 that is mounted on a bearing system 86 that enables independent operation and rotation of the inlet guide vanes 66. A schematic illustration of the example bearing system 86 and hub 65 is shown by way of example. Other configurations that enable separate and independent operation and rotation of the inlet guide vanes 66 are also within the contemplation and scope of this disclosure.

The motor 68, in this disclosed embodiment, is an electric motor that is powered through an electric conduit 80 in communication with a motor controller 72. The motor controller 72 may be an independent controller or part of a flight full authority digital engine controller (FADEC), schematically shown at 74. The motor 68 may also provide for holding of the guide vanes 66 in a stationary position relative to rotation of the fan blades 42.

The disclosed example engine assembly 20 includes the geared architecture 48 through which the electrical communication conduits 80 are directed. The geared architecture 48 provides a convenient path through which the electrical conduit 80 can be threaded. Moreover, although a geared fan engine 20 is disclosed by way of example, the example inlet guide vane system 64 could also be utilized and incorporated into a direct drive engine system.

Figure 3:
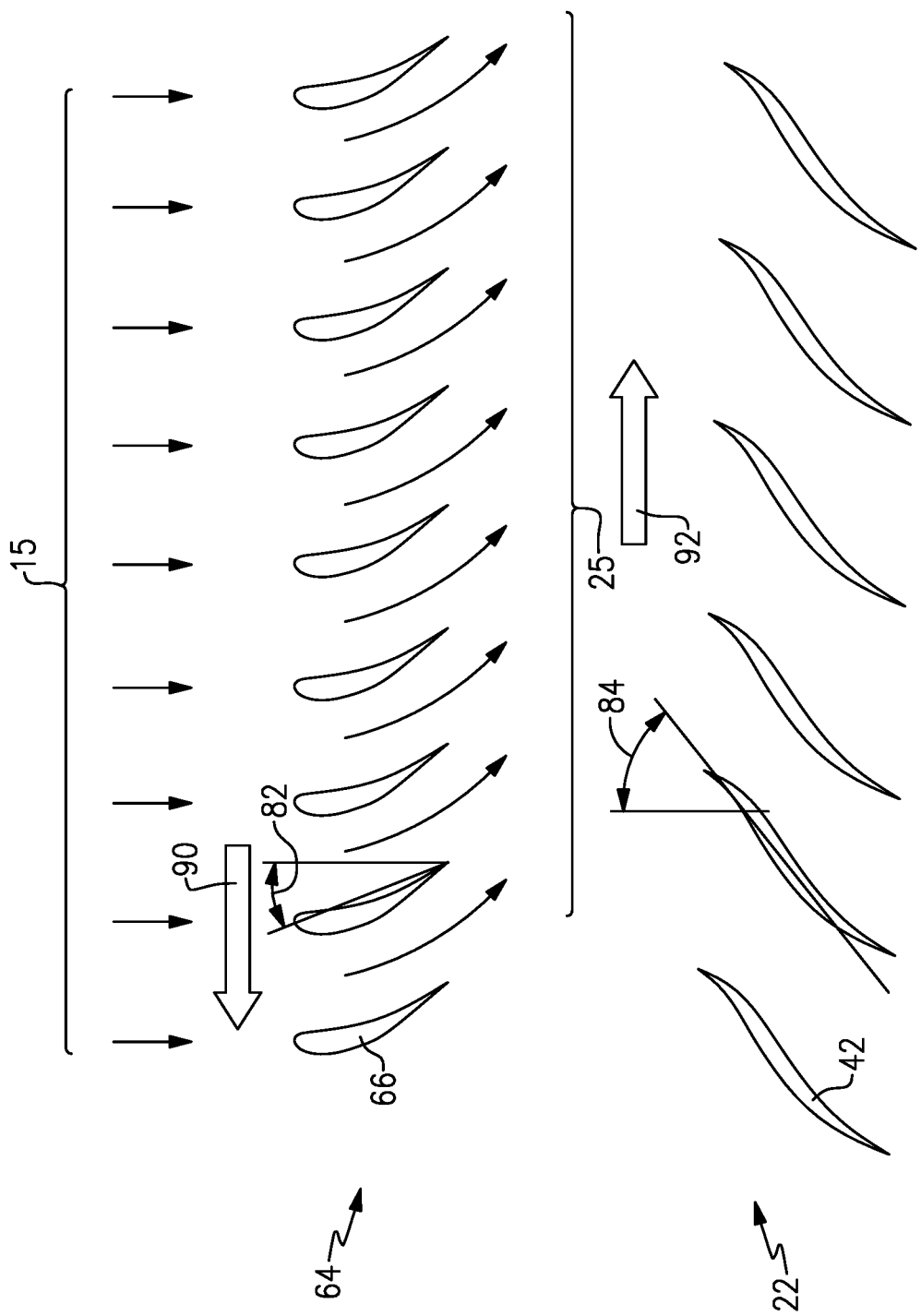
FIG. 3 is a schematic view of the example fan section and inlet guide vane system.

Referring to FIG. 3, with continued reference to FIG. 2, the guide vanes 66 each include a pitch angle 82. The fan blades 42 also include a pitch angle 84. The pitch angle 84 of the fan blades 42 is different than the pitch angle 82 provided by the guide vanes 66. The pitch angle 82 provided by the vanes 66 is not intended to generate thrust, but is instead provided to generate a beneficial and preferential direction to airflow 25 entering the fan section 22. The beneficial airflow 25, in one disclosed example is imparted with a circumferential directed component or pre-swirl that increases fan section propulsive efficiency.

Moreover, the inlet guide vanes 66 do not generate or create a pressure increase that provide thrust. Instead, the guide vanes 66 rotate in a direction and include the pitch angle 82 that provides for the conditioning and directing of airflow into the fan section 22, such that the fan blades 22 can perform more work generating increased thrust. Adjustment and tailoring of a relative speed between the guide vanes 66 and the fan blades 42 provide adjustments to the fan pressure ratio. Adjustments to the fan pressure ratio enable tailoring of engine operation to maximize the thrust generated by the fan section 22 given current environmental and operational conditions.

In operation, inlet airflow 15 enters the nacelle inlet 88 in a direction substantially parallel to the engine axis A. The guide vanes 66 impart a preswirl, schematically shown at 25, to the inlet airflow 15. The preswirled airflow is communicated to the fan blades 42 in a beneficial manner that increases the efficiency at which the fan blades generate propulsive thrust.

The guide vane 66 may be held in a stationary position or may be rotated relative to the fan section 22. In one disclosed example, the guide vanes 66 are rotated in a direction indicated by arrow 90 opposite a direction of the fan blades 42 indicated by arrow 92. Rotation of the guide vanes 66 about the axis A enables the fan section to do more work and achieve a higher pressure ratio for certain operational conditions. Moreover, rotational speed of the guide vane system 64 can be increased or decreased to adjust the pressure ratio and, thereby, the work performed by the fan section 22 to tailor operation of the fan section 22 to current operational conditions.

Accordingly, the example inlet guide vane system 64 enables conditioning of airflow into the fan section 22 to provide more preferential incoming fan flow to enable tailoring of fan pressure and, thereby, propulsive thrust generated by the fan according to engine environmental operating conditions.

Although an example embodiment has been disclosed, a worker of ordinary skill in this art would recognize that this is not intended to be just a material specification and that certain modifications would come within the scope of this disclosure. For that reason, the following claims should be studied to determine the scope and content of this disclosure.

What is claimed is:

1. A gas turbine engine comprising:
   a fan including a plurality of fan blades rotatable about an engine central longitudinal axis;
   a plurality of inlet guide vanes mounted forward of the plurality of fan blades, the plurality of inlet guide vanes selectively rotatable about the engine central longitudinal axis independent of the plurality of fan blades;
   a geared architecture coupled to the fan;
   at least one fan exit guide vane mounted aft of the plurality of fan blades;
   a motor for controlling rotation of the plurality of inlet guide vanes about the engine central longitudinal axis; and
   an electric conduit in electrical communication with the motor, the electrical conduit extending through the at least one fan exit guide vane and the geared architecture.

2. The gas turbine engine as recited in claim 1, wherein the plurality of inlet guide vanes are movable from a non-rotating condition to a rotating condition independent of rotation of the plurality of fan blades.

3. The gas turbine engine as recited in claim 1, wherein the plurality of inlet guide vanes are rotatable at a speed different than the plurality of fan blades.

4. The gas turbine engine as recited in claim 1, including a fan hub supporting rotation of the plurality of fan blades and the plurality of inlet guide vanes are rotatable supported by the fan hub for rotation separate from the fan hub.

5. The gas turbine engine as recited in claim 4, wherein the motor is supported within the fan hub.

6. The gas turbine engine as recited in claim 1, wherein the motor comprises an electric motor.

7. The gas turbine engine as recited in claim 1, wherein the plurality of inlet guide vanes are rotatable about the axis in a direction opposite of rotation of the plurality of fan blades.

8. The gas turbine engine as recited in claim 1, wherein the geared architecture is coupled to a turbine section of the gas turbine engine, the geared architecture including an output driving the fan at a speed different than the turbine section.

9. The gas turbine engine as recited in claim 1, wherein the plurality of inlet guide vanes comprise an airfoil with a pitch that different than a pitch of the plurality of fan blades.

10. A turbofan engine comprising:
   a fan section including a plurality of fan blades supported by a fan hub rotatable about an engine central longitudinal axis;
   a compressor section;
   a combustor in fluid communication with the compressor section;
   a turbine section in fluid communication with the combustor;
   a geared architecture driven by the turbine section for rotating the fan section about the engine central longitudinal axis;
   an inlet guide vane assembly forward of the fan section and rotatable about the engine central longitudinal axis independent of the fan section;
   at least one fan exit guide vane mounted aft of the fan section;
   an electric motor for controlling rotation of the inlet guide vane assembly about the engine central longitudinal axis independent of the fan section; and
   an electrical conduit extending through the at least one fan exit guide vane and the geared architecture and electrically coupled to the electric motor.

11. The turbofan engine as recited in claim 10, wherein means for rotating the inlet guide vane assembly is configured to hold the inlet guide vane assembly in a fixed position relative to rotation of the fan section.

12. The turbofan engine as recited in claim 11, wherein the inlet guide vane assembly is rotatable in a direction opposite rotation of the fan section about the engine central longitudinal axis.

13. The turbofan engine as recited in claim 10, wherein the inlet guide vane assembly is rotatable at a speed different than a speed of the fan section.

14. The turbofan engine as recited in claim 10, wherein the inlet guide vane assembly includes a plurality of vanes disposed at pitch different than the plurality of fan blades.

15. A method of operating a turbofan engine comprising:
   electrically coupling an electric motor to a controller with an electric conduit extending through a geared architecture that drives a fan assembly;
   rotating the fan assembly including a plurality of fan blades about an engine central longitudinal axis; and
   imparting a predefined direction of airflow into the fan assembly with a rotatable inlet guide vane assembly disposed forward of the fan assembly and driven by the electric motor.

16. The method as recited in claim 15, wherein imparting the predefined direction of airflow includes rotating the inlet guide vane in a direction opposite rotation of the fan assembly about the engine central longitudinal axis.

17. The method as recited in claim 15, wherein imparting the predefined direction of airflow includes rotating the inlet guide vane assembly at a speed different than the fan assembly.

18. The method as recited in claim 15, further including holding the inlet guide vane assembly in a fixed position relative to rotation of the fan assembly.

19. The method as recited in claim 15, wherein the electric motor is supported forward of the fan assembly.

* * * * *